April 7, 1925.  C. L. BAUSCH ET AL  1,532,297
CALIPERS
Filed Jan. 14, 1921
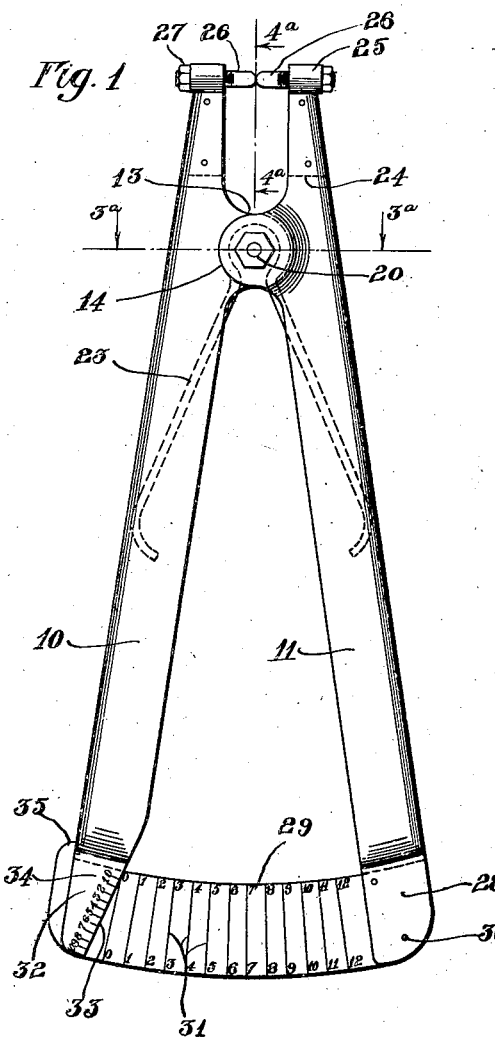
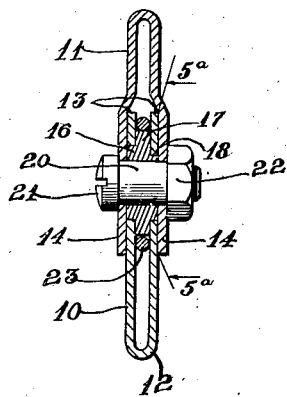
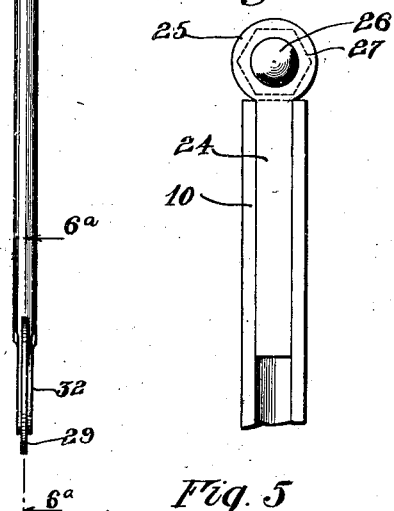
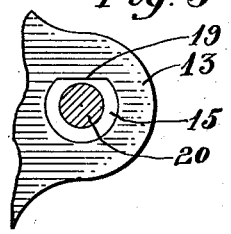
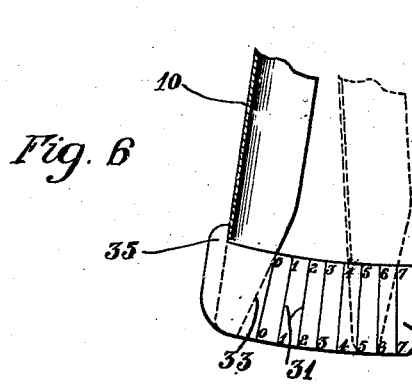
INVENTOR.
Carl L. Bausch.
Edwin Hart.
BY
their ATTORNEY.

Patented Apr. 7, 1925.

1,532,297

UNITED STATES PATENT OFFICE.

CARL L. BAUSCH AND EDWIN HART, OF ROCHESTER, NEW YORK, ASSIGNORS TO BAUSCH & LOMB OPTICAL COMPANY, OF ROCHESTER, NEW YORK, A CORPORATION OF NEW YORK.

CALIPERS.

Application filed January 14, 1921. Serial No. 437,335.

*To all whom it may concern:*

Be it known that we, CARL L. BAUSCH and EDWIN HART, of Rochester, in the county of Monroe and State of New York, have invented certain new and useful Improvements in Calipers; and we do hereby declare the following to be a full, clear, and exact description of the same, reference being had to the accompanying drawings, forming a part of this specification, and to the reference numerals marked thereon.

This invention has to do with measuring instruments and relates more particularly to the variety of such instruments adapted for measuring the distance between two parts or surfaces of an object and commonly known as calipers, the chief object of the invention being to provide a practical, accurate, economical, and convenient instrument of the above character. To these and other ends the invention consists in certain improvements and combination of parts, all as will be hereinafter more fully described, the novel features being pointed out in the claims at the end of the specification.

In the drawings:

Figure 1 is a side elevation of a calipers embodying the present invention.

Figure 2 is an elevation of the same as seen from the left of Figure 1.

Figure 3 is a sectional view on the line 3ª—3ª of Figure 1.

Figure 4 is a fragmentary view as seen from the line 4ª—4ª of Figure 1.

Figure 5 is a fragmentary sectional view as seen from the line 5ª—5ª of Figure 3, and Figure 6 is a similar view on the line 6ª—6ª of Figure 2.

Similar reference characters throughout the several views indicate the same parts.

The embodiment of the invention selected for disclosure herein is intended merely by way of illustration of the principles involved and of a preferred practical application thereof, and is capable of various modifications within the spirit of the invention. This embodiment is of the type known in the art as shear-calipers, comprising pivotally connected members provided with opposed contact parts and means for indicating a dimension included between the contacts.

Referring to the drawings and first to Figure 1, there is shown a pair of members 10 and 11 movably connected in nonintersecting or substantially parallel relation, each preferably formed of a strip of sheet metal folded upon itself as at 12, so that each member has a substantially U-shaped cross section affording a strong and convenient form of construction. The member 10 is provided intermediate its ends with a pair of opposite spaced ears 13, and the member 11 with a similar pair of ears 14 which embrace the ears 13. The latter have openings 15 therein which receive the reduced ends 16 of a bronze bushing 17 having one of its ends slabbed off as at 18 for cooperation with a flattened side 19 of the opening in one of the ears 13, so that the latter carry the bushing in a manner preventing its rotation therein. The bushing and the ears 14 of member 11 are provided with bearing openings which receive and closely fit a pivot bolt 20 provided at one end with a slotted head 21 and at the other end with a threaded portion receiving a nut by with a threaded portion receiving a nut by means of which the bolt is secured in position and maintains the various parts described in proper relation. As apparent from this construction, bolt 20 is clamped immovably in ears 14 and the pivotal movement of members 10 and 11 is obtained by rotation of the bronze bushing on the bolt. A spring 23 is preferably coiled one or more times about the bushing 17 between ears 13 of member 10 with its ends extended for sliding engagement with the inner surfaces of members 10 and 11, to normally urge the contact parts hereafter described toward each other.

The members 10 and 11 have inserted and fixed in adjacent ends thereof, on one side of the pivot, preferably, bars 24 formed at their outer ends with bearing sleeves 25 with which are threadedly engaged studs or spindles 26 forming aligned contact parts projecting toward each other so as to be in engagement in the normal position of the members 10 and 11. The parts 26 are thus supported by means facilitating adjustment if desired and are secured in position in sleeves 25 by means of lock nuts 27.

Member 11 is preferably bifurcated at the end opposite its contact part with its forked portions 28 embracing a scale part or plate 29 which is fixed to the member in any suitable manner, as by spot welding or riveting, as at 30. The scale plate 29 is formed on the arc of a circle concentric with the pivot 20 of members 10 and 11 and is graduated into equal units by division lines 31 marked in the present instance from zero to 12 to represent in millimeters the distance between the contacts 26.

The end 32 of member 10 adjacent the main scale 29 is preferably bifurcated to embrace and move over the scale during relative pivotal movement of the members, and this end 32 of member 10 is preferably formed on its inner side adjacent the scale with a part or straight surface 33 extending in a direction eccentric to the pivot 20, or in other words obliquely or at an inclination with scale 29. That portion of the oblique surface 33 intercepted between adjacent divisions 31 of scale 29 is preferably divided into ten parts marked with the units zero to 10, forming micrometer indicia or a scale 34 for indicating fractional parts or tenths of the unit graduations on the main scale. Scale plate 29 carries a stop lug 35 for limiting engagement with the crotch of the bifurcated end of member 10.

It is apparent from the above description of the construction that members 10 and 11 may be conveniently gripped in the hand and pressed toward each other to separate contacts 26 which may be allowed to close under the action of spring 23 into contact with parts or surfaces of an object the distance between which is to be determined. The contacts are thus engaged with objects to be measured with a substantially uniform spring pressure which also tends to maintain the contacts in close engagement with an object, thereby facilitating accurate manipulation of the instrument in use. By such setting of the contacts, the oblique end 33 of member 10 is moved over the main scale 29 and the zero point of the micrometer scale 34 moves over the graduations of the main scale thereby indicating on the latter the approximate dimension to be determined, while the dimension is more particularly or precisely shown by the micrometer scale which indicates at the point where it is intercepted by the division line of scale 29 the fractional part or number of tenths to be added to the units indicated on the main scale to give the correct reading.

As apparent from the description and drawings, the construction is simple and economical to manufacture, comprising but a few parts, which are rigid and durable in character so that there is little likelihood of derangement of the parts in use. The calipers is therefore accurate within the degree of precision for which it is intended and the construction and arrangement of the parts provides an instrument which is not only convenient to manipulate in use but in which the unit and fractional indications are both made at the same time in a conveniently legible manner.

We claim as our invention:

Calipers comprising a pair of members each formed of a strip of sheet metal folded upon itself to provide a substantially U-shaped cross section, means pivotally connecting said members intermediate their ends in substantially parallel relation, said members having the opposing ends thereof on one side of the pivot adapted for contact with opposite sides of an object to be measured, a spring tending to move said contact ends together, a part carried by one of said members on the opposite side of the pivot provided with a main scale arranged in an arc concentric with said pivot and graduated in suitable units, and an opposing end portion on the other member bifurcated to slidably embrace opposite sides of said scale part and provided with a scale arranged obliquely to said main scale for movement thereover to indicate in fractions of a unit of said main scale.

CARL L. BAUSCH.
EDWIN HART.